(12) United States Patent
Hata et al.

(10) Patent No.: US 6,576,372 B1
(45) Date of Patent: Jun. 10, 2003

(54) POLYMER COMPOUND, BINDER RESIN, COMPOSITION FOR ION-CONDUCTIVE POLYMER ELECTROLYTE, AND SECONDARY CELL

(75) Inventors: Kimiyo Hata, Chiba (JP); Takaya Sato, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/700,848

(22) PCT Filed: Mar. 22, 2000

(86) PCT No.: PCT/JP00/01731

§ 371 (c)(1),
(2), (4) Date: Nov. 21, 2000

(87) PCT Pub. No.: WO00/56797

PCT Pub. Date: Sep. 28, 2000

(30) Foreign Application Priority Data

Mar. 23, 1999 (JP) ............................................. 11-078085

(51) Int. Cl.$^7$ ................................................. H01M 6/18
(52) U.S. Cl. ........................ 429/314; 429/217; 429/233; 429/245; 429/304; 252/62.2
(58) Field of Search ................................. 429/314, 217, 429/233, 304, 245; 252/62.2; 528/49; 560/25

(56) References Cited

U.S. PATENT DOCUMENTS 5,538,811 A    7/1996  Kanbara et al. ......... 429/218.1
5,558,959 A *  9/1996  Venugopal et al. ......... 429/314
5,912,093 A *  6/1999  Wen et al. ................... 524/401

FOREIGN PATENT DOCUMENTS

| JP | A059253  |   | 1/1993 |
| JP | A536438  |   | 2/1993 |
| JP | A685338  |   | 3/1994 |
| JP | A685339  |   | 3/1994 |
| JP | A6140052 |   | 5/1994 |
| JP | 11-3712  | * | 1/1999 |
| JP | A1112458 |   | 1/1999 |

* cited by examiner

*Primary Examiner*—Laura Weiner
(74) *Attorney, Agent, or Firm*—Birch, Stewart, Kolasch & Birch, LLP

(57) ABSTRACT

A polyurethane compound, due to a substituent having a large dipole moment introduced onto the polyurethane molecule, can improve the closeness of contact between electrodes and an electrolyte and achieve an interfacial impedance comparable to that of electrolyte solution, while retaining a high dielectric constant and the ability to dissolve ion-conductive salts to a high concentration. The invention is also directed at a binder resin composed of the polymeric compound, an ion-conductive polymer electrolyte composition of high ionic conductivity and high bond strength which is composed primarily of an ion-conductive salt and a polyelectrolyte-providing polymer made of the polymeric compound, and a secondary cell in which these serve as constituents.

13 Claims, No Drawings

POLYMER COMPOUND, BINDER RESIN, COMPOSITION FOR ION-CONDUCTIVE POLYMER ELECTROLYTE, AND SECONDARY CELL

This application is the national phase under 35 U.S.C. §371 of PCT International Application No. PCT/JP00/01731 which has an International filing date of Mar. 22, 2000 which designated the United States of America, the entire contents of which are hereby incorporated by reference.

TECHNICAL FIELD

The present invention relates to polyurethane compounds which can be utilized as electrochemical materials, including electrolytes for various types of secondary cells and adhesive binders for battery active materials. The invention relates also to binder resins, to ion-conductive polymer electrolyte compositions composed primarily of ion-conductive salts in combination with polyelectrolyte-providing polymers made of such polymeric compounds, and to secondary cells.

BACKGROUND ART

Electrolytes used in secondary cells and other electronic and electrical devices have until now been substances that are liquid at or above room temperature, such as water, propylene carbonate, ethylene carbonate and tetrahydrofuran. In lithium ion cells in particular, use is commonly made of organic liquid electrolytes which tend to evaporate, ignite, and burn rather easily. To ensure long-term stability, it is necessary to increase the airtightness of the container by using a metal can as the cell enclosure. Failure to do so leaves open the possibility that the electrolyte will evaporate and the vaporized electrolyte will ignite and cause a fire.

Hence, there has been a considerable rise in the eight of electrical and electronic devices which use organic liquid electrolytes. Moreover, in the manufacture of thin, large-area stacked cells, the process of injecting electrolyte solution is quite difficult. Another problem has been a shortened cycle life due to the drop off of battery active material and dendrite deposition.

By contrast, the use of polymeric compounds as the electrolyte provides electrolytes which have a very low volatility and are not prone to evaporation. Such polymer electrolytes include solid electrolytes composed of, for example, polyethylene oxide and a lithium salt.

However, these polymer electrolytes have a low conductivity compared with liquid electrolytes. Solid electrolytes composed of polyethylene oxide having branched chains have been proposed in order to enhance the conductivity, but the conductivity in such a case is still less than $10^{-5}$ S/cm, which is rather low. In addition, the closeness of contact between the electrodes and the electrolyte is difficult to maintain. The unfortunate result is a large interfacial impedance, leading to an increase in polarization.

Moreover, a major problem encountered when polymer electrolytes are used to manufacture film-type batteries concerns adhesion between the positive and negative electrodes and the polymer electrolyte.

Specifically, film-type batteries which use solid polymer electrolytes generally have a positive electrode/solid electrolyte/negative electrode construction. Unlike cylindrical batteries in which the positive electrode/solid electrolyte/negative electrode composite is coiled and placed in a can, the absence of a coiling pressure in film-type batteries means that pressure is not applied between the positive electrode and the solid electrolyte and between the solid electrolyte and the negative electrode, allowing the solid electrolyte to separate readily from the positive electrode and the negative electrode. Thus, the solid electrolyte disposed between the positive electrode and the negative electrode, in addition to its role as an electrolyte, must also have the ability to strongly bond the positive and negative electrodes. That is, it must have tackiness and adhesiveness.

In addition, to lower the interfacial resistance between the electrodes and the solid electrolyte, the same electrolyte polymer as that used in the solid electrolyte is sometimes employed as a binder resin (electrode binder). In such cases, the electrolyte polymer which serves also as a binder resin must have the ability to bond a powdery battery active material; that is, it must have tackiness in addition to ionic conductivity.

The solid polymer electrolytes that have hitherto been reported in the literature are lacking not only in sufficient ionic conductivity, but also in tacky and adhesive properties. Hence, a need has been felt for further improvement.

DISCLOSURE OF THE INVENTION

The present invention was conceived in light of these circumstances. One object of the invention is to provide a polyurethane compound in which a substituent having a large dipole moment has been introduced onto the polyurethane molecule and which improves the closeness of contact between the electrodes and the electrolyte, thus enabling to obtain an interfacial impedance comparable to that of an electrolyte solution, while maintaining a high dielectric constant and the ability to dissolve an ion conductive salt to a high concentration. Another object of the invention is to provide a binder resin composed of the same polymeric compound; an ion-conductive polymer electrolyte composition having a high ionic conductivity and a high bond strength which is composed primarily of an ion-conductive salt and a polyelectrolyte-providing polymer made of the same polymeric compound: and a secondary cell comprising the binder resin and the ion-conductive polymer electrolyte composition.

Conducting extensive investigations in order to achieve these aims, the inventors have made the following discoveries.

(1) An ion-conductive solid polymer electrolyte has a considerably high concentration of ion-conductive metal salt, and ion association readily arises in a low-dielectric-constant polymer matrix, resulting in a decline in conductivity due to ion association.

(2) In such cases, introducing onto the polymer a substituent having a large dipole moment so as to increase the polarity of the matrix discourages ion association, thereby enhancing ionic conductivity.

(3) Introducing a substituent having a large dipole moment onto a polyurethane compound dramatically improves adhesion and tackiness.

Pursuing investigations even further based on these findings, the inventors have found also that polyurethane compounds which have been prepared by reacting an excess of an isocyanate compound with a polyol compound to form a polyurethane compound and reacting the hydroxyl group of an alcohol compound bearing a substituent having a large dipole moment with some or all of the remaining isocyanate groups on the polyurethane compound, and in which the substituent having a large dipole moment is coupled to the polyurethane compound through a NHCOO linkage, have a high dielectric constant, the ability to dissolve the ion-conductive salt to a high concentration and excellent adhesive properties, thus affording close contact between the electrodes and the electrolyte as well as an interfacial impedance comparable with that of electrolyte solutions. The inventors have additionally discovered that binder resins composed of such polymeric compounds have the ability to bond powdery battery active materials, and that ion-conductive polymer electrolyte compositions composed primarily of an ion-conductive salt and a polyelectrolyte-providing polymer made of the above polymeric compound have a high ionic conductivity and a high tackiness. Hence, it has become apparent that, in addition to their role as excellent electrolytes, such polymer electrolyte compositions also serve to firmly bond the positive and negative electrodes, and are thus ideally suited for use in film-type batteries and other kinds of secondary cells.

Accordingly, the present invention provides:

(1) a polyurethane compound prepared by reacting an excess of an isocyanate compound with a polyol compound to form a polyurethane compound and reacting the hydroxyl group of an alcohol compound bearing a substituent having a large dipole moment with some or all of the remaining isocyanate groups on the polyurethane compound, wherein the substituent having a large dipole moment is coupled to the polyurethane compound through a NHCOO linkage;

(2) a binder resin comprising the above polyurethane compound;

(3) an ion-conductive polymer electrolyte composition composed primarily of an ion-conductive salt and the above polyurethane compound;

(4) the above composition which is obtained by reacting (A) an isocyanate compound, (B) a polyol compound and (C) an alcohol compound bearing at least one hydroxyl group and at least one substituent having a large dipole moment in a molecule, in a solvent dissolving the ion-conductive salt; and (5) a secondary cell comprising a positive electrode, a negative electrode and a solid polymer electrolyte layer, characterized in that the solid polymer electrode layer is composed of the above ion-conductive polymer electrolyte composition and lies between the positive electrode and the negative electrode.

BEST MODE FOR CARRYING OUT THE INVENTION

The invention is described more fully below.

The high molecular weight or polymeric compound of the invention is a polyurethane compound prepared by reacting an excess of an isocyanate compound with a polyol compound to form a polyurethane compound and reacting the hydroxyl group of an alcohol compound bearing a substituent having a large dipole moment with some or all of the remaining isocyanate groups on the polyurethane compound, wherein the substituent having a large dipole moment is coupled to the polyurethane compound through a NHCOO linkage. This polymeric compound is prepared by reacting (A) an isocyanate compound, (B) a polyol compound and (C) an alcohol compound bearing at least one hydroxyl group and at least one substituent having a large dipole moment in a molecule.

The isocyanate compound serving as component (A) may be an alicyclic isocyanate, aliphatic isocyanate or aromatic isocyanate, so long as the molecule has at least two isocyanate groups. Illustrative examples of the isocyanate compound include methylenediphenyl diisocyanate (MDI), polymeric methylenediphenyl diisocyanate (polymeric MDI), tolylene diisocyanate (TDI), lysine diisocyanate (LDI), hydrogenated tolylene diisocyanate, hexamethylene diisocyanate (HDI), xylene diisocyanate (XDI), hydrogenated xylene diisocyanate, naphthylene diisocyanate (NDI), biphenylene diisocyanate, 2,4,6-triisopropylphenyl diisocyanate (TIDI), diphenyl ether diisocyanate, tolidine diisocyanate (TODI), isophorone diisocyanate (IPDI), 4,4'-dicyclohexylmethane diisocyanate (HMDI), tetramethylxylene diisocyanate (TMXDI), 2,2,4-trimethylhexamethylene diisocyanate (TMHDI), 1,12-diisocyanatododecane (DDI), norbornane diisocyanate (NBDI), 2,4-bis(8-isocyanatooctyl)-1,3-dioctylcyclobutane (OCDI), and 2,2,4- and 2,4,4-trimethylhexamethylene diisocyanate (TMDI). These may be used alone or as combinations of two or more thereof.

Illustrative examples of the polyol compound serving as component (B) include polymeric polyols (e.g., polyethylene glycol, polypropylene glycol, ethylene glycol-propylene glycol copolymer), ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis(β-hydroxy)benzene, p-xylylenediol, phenyldiethanolamine, methyldiethanolamine and 3,9-bis(2-hydroxy-1,1-dimethyl)-2,4,8,10-tetraoxaspiro[5,5]undecane.

Of these polyol compounds, suitable examples of polyfunctional polyols include trifunctional polyethylene glycol, trifunctional polypropylene glycol, trifunctional (ethylene glycol-propylene glycol) random copolymers, difunctional polyethylene glycol, difunctional polypropylene glycol and difunctional (ethylene glycol-propylene glycol) random copolymers. Polyfunctional polyols having a functionality of 4, 5 or more can also be used.

If a polymeric polyol is used as component (B), its weight-average molecular weight (Mw) is preferably from 200 to 10,000, more preferably from 500 to 8,000, and most preferably from 1,000 to 6,000. A polymeric polyol having too small a weight-average molecular weight may lower the physical properties of the resulting polyurethane compound, whereas a weight-average molecular weight that is too large will at times make handling difficult.

The polymeric polyol has a content of polyethylene glycol (EO) units which is at least 20% by molar, more preferably at least 30% by molar, more preferably at least 50% by molar, and most preferably at least 80% by molar. Too low a content of polyethylene glycol units may lower the ability of the inventive polymeric compound to dissolve ion-conductive salts.

In the practice of the invention, the above polyol compounds may be used singly or as combinations of two or more thereof. The use of a difunctional polyol in combination with a trifunctional polyol is also possible. The mixing ratio of the difunctional polyol to the trifunctional polyol in this case is preferably 1:25 by weight, although this depends also on the molecular weight of the mixture.

If necessary, use can also be made of a monohydric alcohol. Examples of suitable monohydric alcohols include methanol, ethanol, butanol, ethylene glycol monoethyl ether and diethylene glycol monoethyl ether. Additional exemplary alcohols include polyethylene glycol monoethyl ether, polypropylene glycol monoethyl ether and ethylene glycol-propylene glycol copolymer monoethyl ether obtained by methyl or ethyl substitution at one end of polyethylene glycol, polypropylene glycol or ethylene glycol-propylene glycol copolymer.

In addition to above components (A) and (B), an alcohol compound (C) having a substituent with a large dipole moment is also reacted to form the polyurethane compound of the invention.

That is, in ion-conductive solid polymer electrolytes, ion association readily arises within a low-dielectric-constant polymer matrix having a high ion-conductive metal salt concentration, leading to a decline in conductivity due to ion association. Introducing a substituent having a large dipole moment to enhance the matrix polarity has the effect of discouraging ion association, thereby improving conductivity. Moreover, the inventors' investigations have led to the surprising discovery that, in the case of polyurethane compounds, introducing a substituent having a large dipole moment greatly improves the adhesiveness and tackiness of the polyurethane compound. It is thus meaningful to introduce onto the polyurethane a substituent having a large dipole moment.

To achieve this end, an alcohol compound bearing at least one hydroxyl group and at least one substituent having a large dipole moment in a molecule should be reacted with the isocyanate compound.

Examples of the alcohol moiety in the alcohol compound bearing at least one hydroxyl group and at least one substituent having a large dipole moment include aliphatic monohydric alcohols of 1 to 10 carbons, and preferably 1 to 5 carbons; and aromatic alcohols such as phenol, benzyl alcohol and cresol.

The substituent having a large dipole moment is preferably one for which the value of the group moment when the substituent is bonded to a phenyl, methyl or ethyl group is at least 1.0 Debye, preferably 1.0 to 5.0 Debye, more preferably 1.2 to 4.5 Debye. Illustrative examples include —OCH$_3$, —SCH$_3$, —NH$_2$, —I, —Br, —Cl, —F, —COOH, —COOCH$_3$, —CHO, —COCH$_3$, —NO$_2$ and —CN. Of these substituents, a neutral substituent is preferable to an ionic substituent, and —CN (cyano) is especially preferred.

Illustrative examples of such alcohol compounds serving as component (C) include the amino-group bearing compounds aminoethanol, propanolamine, ethanolamine, acetylethanolamine and aminochlorophenol; the iodo group-bearing compounds iodoethanol and iodophenol; the bromo group-bearing compounds bromoethanol, bromopropanol and bromophenol; the chloro group-bearing compounds chloroethanol, chlorobutanol, chlorophenol and chlorocresol; the fluoro group-bearing compounds trifluoroethanol and tetrafluorophenol; the carboxyl group-bearing compounds salicylic acid and hydroxybutyric acid; the acetyl group-bearing compounds acetylnaphthol and N-acetylethanolamine; the nitro group-bearing compounds nitroethanol, nitrophenol and methylnitrophenol; and the cyano group-bearing compounds ethylene cyanohydrin, hydroxyacetonitrile, cyanophenol and cyanobenzyl alcohol.

Therefore, the alcohol compound used as component (C) in the invention is an alcohol on which some of the hydrogen atoms have been substituted with the above groups having a large dipole moment, such as cyano. Preferred examples include substituted alcohols bearing a cyanobenzyl group, a cyanobenzoyl group, or an alkyl group having a cyano group bonded thereto. Among others, alcohols having a cyanoethyl group (—CH$_2$CH$_2$CN) are most preferred.

In the present invention, special note should be taken of the fact that the deliberate introduction of a substituent having a large dipole moment onto the polyurethane compound results in a higher resin conductivity than if such a substituent is not introduced. Hence, the conductivity as well as the adhesiveness and tackiness of the polyurethane compound are greatly enhanced. The substance necessary for achieving this effect is component (C) an alcohol compound bearing at least one hydroxyl group and at least one substituent having a large dipole moment in a molecule. The amount of this alcohol compound included is important. It is advantageous for this amount to be such that, letting (A) be the isocyanate compound, (B) the polyol compound, and (C) the alcohol compound bearing at least one hydroxyl group and at least one substituent with a large dipole moment in a molecule, the weight ratio (C)/((A)+(B)+(C)) is in a range of preferably 0.01 to 0.4, more preferably 0.02 to 0.2, and most preferably 0.02 to 0.1. Increasing the amount of component (C) enhances the polarity of the resin, which in turn raises the conductivity and improves the adhesive properties.

In the practice of the invention, when the isocyanate compound (A) is reacted with the polyol compound (B) and the alcohol compound (C), the stoichiometric ratio between [NCO] on the isocyanate compound and [OH] on the component (B) and (C) is important.

That is, [NCO]≧[OH]. More specifically, the NCO index, defined as [NCO]/[OH], is preferably at least 1, more preferably from 1 to 2.3, even more preferably from 1.01 to 1.25, and most preferably from 1.04 to 1.25. Too small an NCO index may result in a decline in physical strength and a longer reaction time until curing is achieved. On the other hand, an NCO index which is too large may result in a loss of viscoelasticity, giving a cured product that is hard and brittle, in addition to which the remaining isocyanate groups may react with moisture in the air, causing deterioration over time.

When the isocyanate compound (A), the polyol compound (B), and the alcohol compound bearing at least one hydroxyl group and at least one substituent having a large dipole moment in a molecule (C) are reacted, ordinary amounts of urethane-forming catalyst, defoamer and the like may be added if necessary.

Illustrative, non-limiting examples of the urethane-forming catalyst include amine catalysts such as 1,4-diazabicyclo[2.2.2]octane (DABCO), triethylamine and tetramethylbutylamine; and metal catalysts such as tin compounds (e.g., tin octanoate and dibutyltin dilaurate) and lead compounds.

The polymeric compound of the invention can be prepared by mixing and reacting above components (A) to (C) in the indicated amounts and including also, if necessary, other components such as a urethane-forming catalyst and a defoamer.

The polyurethane compound of the invention is prepared by reacting an excess of the isocyanate compound serving as above component (A) with the polyol compound serving as above component (B) to form a polyurethane compound and reacting the hydroxyl groups on the alcohol compound serving as above component (C) with the isocyanate groups remaining on the polyurethane compound. The substituent having a large dipole moment bonds with the polyurethane compound through a NHCOO linkage. The resulting compound can be represented by the following formula:

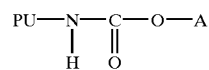

wherein PU stands for the polyurethane compound, and A is the alcohol residue bearing a substituent having a large dipole moment.

For example, when the alcohol in component (C) is ethylene cyanohydrin, the formula becomes

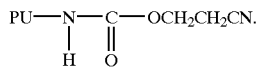

Because the polymeric compound of the invention has a substituent with a large dipole moment, it possesses a high dielectric constant, a high tack strength, and the ability to dissolve ion-conductive salts to a high concentration, making it highly suitable as an electrolyte for various types of secondary cells and other electrical and electronic devices. Moreover, binder resins composed of the inventive polymeric compound have excellent tackiness and are thus endowed with the ability to bond powdery battery active materials, making them suitable as binders and other types of electrochemical materials.

The polymeric compound (polyelectrolyte-providing polymer) of the invention has the ability to dissolve ion-conductive salts to a high concentration. Moreover, because a substituent having a large dipole moment has been introduced onto the molecule, the dissolution of an ion-conductive salt to a high concentration does not readily give rise to ion association, and so there is no decline in ionic conductivity. Accordingly, the ion-conductive polymer electrolyte composition of the invention is composed primarily of a polymeric compound (a polyelectrolyte-providing polymer) and an ion-conductive salt.

Any ion-conductive salt employed in ordinary electrochemical devices may be used without particular limitation. Illustrative examples include $LiClO_4$, $LiBF_4$, $LiAsF_6$, $LiPF_6$, $LiSbF_6$, $LiCF_3SO_3$, $LiCF_3COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$, $(C_4H_9)_4NClO_4$, $LiN(CF_3SO_2)_2$ and $Et_4NPF_6$ (Et: ethyl group). These may be used alone or as combinations of two or more thereof.

The amount of the ion-conductive salt included in the ion-conductive polymer electrolyte composition of the invention varies according to such factors as the type of ion-conductive salt used and the molecular weight of the polymeric compound. In general, however, the amount of ion-conductive salt used is preferably from 5 to 1,000 parts by weight, more preferably from 10 to 500 parts by weight, further preferably from 10 to 100 parts by weight, and most preferably from 10 to 50 parts by weight per 100 parts by weight of the polyelectrolyte-providing polymer. Too little ion-conductive salt gives a dilute ion conductor concentration, which may actually result in too low a conductivity. On the other hand, the inclusion of too much ion-conductive salt often exceeds the ability of the polymer matrix to dissolve the ion-conductive salt, leading to salt deposition.

In addition to the polyelectrolyte-providing polymer and the ion-conductive salt, the ion-conductive polymer electrolyte composition of the invention may also have added thereto a solvent capable of dissolving the ion-conductive salt.

Illustrative examples of such solvents include chain ethers, such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-methyltetrahydrofuran, 1,3-dioxolane and 4,4-dimethyl-1,3-dioxane; butyrolactones such as γ-butyrolactone, γ-valerolactone, δ-valerolactone, 3-methyl-1,3-oxazolidin-2-one and 3-ethyl-1,3-oxazolidin-2-one; and solvents commonly used in electrochemical devices, such as water, alcohol solvents (e.g., methanol, ethanol, butanol, ethylene glycol, propylene glycol, diethylene glycol, 1,4-butanediol and glycerol), polyoxyalkylene polyols (e.g., polyethylene oxide, polypropylene oxide, polyoxyethylene-oxypropylene glycol and combinations of two or more thereof), amide solvents (e.g., N-methylformamide, N,N-dimethylformamide, N-methylacetamide and N-methylpyrrolidinone), carbonate solvents (e.g., diethyl carbonate, dimethyl carbonate, ethylmethyl carbonate, propylene carbonate, ethylene carbonate, styrene carbonate), and imidazolidinone solvents (e.g., 1,3-dimethyl-2-imidazolidinone). These solvents may be used singly or as mixtures of two or more thereof. Of these, the use of the carbonate solvents such as propylene carbonate which are nonaqueous solvents is especially preferred.

The solvent is added in an amount of preferably 1 to 90% by weight, and especially 25 to 75% by weight, based on the overall weight of the ion-conductive polymer electrolyte composition. The addition of too much solvent may compromise the adhesive properties of the polyelectrolyte-providing polymer.

In preparing the ion-conductive polymer electrolyte composition of the invention, a diluent solvent may be used for the purpose of reducing the viscosity of the composition for facilitating the formation of thin film. The diluent solvent used herein must be inert to the isocyanate compound, permit the isocyanate compound and the polyol compound to be dissolved therein, and be a relatively low-boiling solvent having a boiling point of up to 120° C. As long as these requirements are met, any desired solvent may be used. Exemplary diluent solvents are tetrahydrofuran, acetone, methyl ethyl ketone, toluene, 1,4-dioxane, and ethylene glycol dimethyl ether.

The polyurethane compounds (serving as binder resins and polyelectrolyte-providing polymers) and ion-conductive polymer electrolyte compositions of the invention have a bond strength of preferably at least 0.8 kN/m, more preferably at least 1 kN/m, and most preferably at least 1.5 kN/m, as measured by the peeling bond strength test procedure standards for adhesives in accordance with JIS K6854 (1994).

In addition to a high bond strength, the ion-conductive polymer electrolyte composition of the invention also has a high ionic conductivity. For example, an ion-conductive polymer electrolyte composition containing from 5 to 1,000 parts by weight of ion-conductive salt per 100 parts by weight of the polyelectrolyte-providing polymer was cast onto a stainless steel plate using a doctor knife applicator. Two sheets formed in this way were laminated to give a sandwich construction which was then cured by being held at 80° C. for 4 hours. The ionic conductivity of the cured laminate, as determined by complex conductivity measurement, was about $3 \times 10^{-4}$ S/cm, which is quite high.

Next, the ion-conductive polymer electrolyte composition of the invention is cured by heating preferably at room temperature to 120° C., and especially 60 to 100° C., for a period of preferably 0 to 7 hours, and especially 1 to 4 hours. Curing gives an ion-conductive solid polymer electrolyte having resilience.

On account of its high ionic conductivity and high tackiness, this ion-conductive solid polymer electrolyte not only fulfills the role of a solid electrolyte, when disposed between a positive electrode and a negative electrode it also serves to firmly bond the two electrodes together. These characteristics make it highly suitable for use as a solid electrolyte in film-type batteries and various other types of secondary cells and other related applications.

The ion-conductive solid polymer electrolyte of the invention may be formed into a thin film or film-like solid electrolyte layer by application to a uniform thickness using any suitable thin film-forming technique such as roller coating (with an applicator roll), screen coating, doctor blade coating, spin coating or bar coating.

The secondary cell of the invention comprises a positive electrode, a negative electrode, and a solid polymer electrolyte layer composed of the inventive ion conductive polymer electrolyte composition disposed between the positive electrode and the negative electrode.

The positive electrode used herein is preferably a composite positive electrode comprising a positive electrode current collector coated with a positive electrode dope composed of a mixture of the inventive binder resin and a positive electrode active material. It is also preferable for a solid polymer electrolyte layer composed of the ion-conductive polymer electrolyte composition of the invention to lie between the composite positive electrode and the negative electrode composed of lithium foil or the composite negative electrode obtained by coating a negative electrode current collector with a negative electrode dope containing the inventive binder resin and a negative electrode active material in admixture.

The positive electrode active material is selected as appropriate for the electrode application, the type of battery and other considerations. For instance, examples of positive electrode active materials that are suitable for use as the positive electrode in a lithium secondary cell include group I metal compounds such as $CuO$, $Cu_2O$, $Ag_2O$, $CuS$ and $CuSO_2$; group IV metal compounds such as $TiS$, $SiO_2$ and $SnO$; group V metal compounds such as $V_2O_5$, $V_6O_{13}$, $Vo_x$, $Nb_2O_5$, $Bi_2O_3$ and $Sb_2O_3$; group VI metal compounds such as $CrO_3$, $Cr_2O_3$, $MoO_3$, $MoS_2$, $WO_3$ and $SeO_2$; group VII metal compounds such as $MnO_2$ and $Mn_2O_4$; group VIII metal compounds such as $Fe_2O_3$, $FeO$, $Fe_3O_4$, $Ni_2O_3$, $NiO$ and $CoO_2$; and conductive polymeric compounds such as polypyrrole, polyaniline, poly(p-phenylene), polyacetylene and polyacene.

Calcogen compounds capable of adsorbing and releasing lithium ions and calcogen compounds containing lithium ions can be used as the positive electrode active material in lithium ion secondary cells.

Examples of the calcogen compounds capable of adsorbing and releasing lithium ions include $FeS_2$, $TiS_2$, $MOS_2$, $V_2O_5$, $V_6O_{13}$, and $MnO_2$.

Examples of the calcogen compounds containing lithium ions include $LiCoO_2$, $LiMnO_2$, $LiMn_2O_4$, $LiMo_2O_4$, $LiV_3O_8$, $LiNiO_2$, and $Li_xNi_yM_{1-y}O_2$ (wherein M stands for selected from Co, Mn, Ti, Cr, V, Al Sn, Pb, and Zn, $0.05 \leq x \leq 1.10$, and $0.5 \leq y \leq 1.0$.).

On use, the positive electrode active material is compounded with an ion-conductive solid polymer electrolyte, a binder and a conductive agent to form a composite positive electrode. The ion-conductive solid polymer electrolyte and binder resin used herein are preferably the ion-conductive solid polymer electrolyte and binder resin of the present invention, respectively. Suitable examples of the conductive agent include acetylene black and natural graphite.

The composite positive electrode may be formed to a thin film of uniform thickness by any suitable film-forming technique such as roller coating (with an applicator roll), screen coating, doctor blade coating, spin coating or bar coating.

The negative electrode active material is selected as appropriate for the electrode application, the type of battery and other considerations. For instance, examples of materials that are suitable for use as the negative electrode in lithium secondary cells and lithium ion secondary cells include alkali metals, alkali alloys, carbon materials, and the same materials mentioned above in regards to the positive electrode active material.

Illustrative examples of alkali metals include lithium, sodium and potassium. Examples of alkali metal alloys include metallic lithium, Li—Al, Li—Mg, Li—Al—Ni, sodium, Na—Hg and Na—Zn.

Examples of the carbon material include graphite, carbon black, coke, glassy carbon, carbon fibers, and sintered compacts thereof.

The negative electrode active material may be used alone, although its use as a composite negative electrode prepared by the addition of an ion-conductive solid polymer electrolyte, a binder, a conductive agent and the like is generally preferred. The ion-conductive solid polymer electrolyte and binder resin used herein are preferably the ion-conductive solid polymer electrolyte and binder resin of the present invention, respectively. Suitable examples of the conductive agent include acetylene black and natural graphite.

The composite negative electrode may be formed to a thin film of uniform thickness by any suitable film-forming technique such as roller coating (with an applicator roll), screen coating, doctor blade coating, spin coating or bar coating.

The use of the inventive binder resin as the binder in the positive electrode, the negative electrode, and the ion-conductive solid polymer electrolyte layer which together constitute the secondary cell of the invention enables the powdery positive and negative electrode active materials to be firmly bound. Moreover, because the binder resin and the solid polymer electrolyte have the same composition, interfacial resistance between the electrodes and the solid electrolyte can be reduced. As a result, there can be obtained film-type batteries, particularly secondary cells (e.g., lithium secondary cells and lithium ion secondary cells), of outstanding performance which feature a high ionic conductivity and strong bonding between the electrodes and the solid electrolyte.

The method of manufacturing film-type batteries according to the present invention is described more fully below.

(1) The isocyanate compound (A), polyol compound (B), and alcohol compound bearing at least one hydroxyl and at least one substituent having a large dipole moment (C) are mixed and thoroughly stirred, following which the mixture is degassed by reducing the pressure, giving a liquid I.

(2) Lithium perchlorate is dissolved to a concentration of 1 M in liquid I, to give a liquid II.

(3) A powder mixture of $LiCoO_2$ and Ketjen Black in a weight ratio of 90:10 is mixed with liquid I in a weight ratio of liquid I to the powder of 1:10, giving a positive electrode dope.

(4) Using a doctor knife applicator, the positive electrode dope is cast onto a positive electrode current collector in the form of aluminum foil, then held at 80° C. for 2 hours to convert it to a semisolid state.

5) Lithium foil is pressure bonded as the negative electrode onto a stainless steel current collector, forming what is referred to hereinafter as the negative electrode.

6) Liquid II is cast with a doctor knife applicator onto the positive electrode side of the composite (positive electrode+positive electrode current collector) obtained in step (4) above. The negative electrode of lithium foil is then placed over the side of the positive electrode composite on which the liquid II has been cast. The assembly is held under pressure and at 80° C. for 6 hours, effecting curing. This procedure gives a film-type cell.

The resulting film-type battery has an aluminum foil/composite positive electrode/cured liquid II/lithium foil/stainless steel current collector construction. It is rechargeable and clearly functions effectively as a secondary battery.

EXAMPLE

Examples and comparative examples are given below to illustrate the invention, but not intended to limit the scope thereof. In the Examples, all parts are by weight.

Example 1

Preparation of Ion-Conductive Polymer Electrolyte Composition

Lithium perchlorate, 1.37 part, was dissolved in a suitable amount of tetrahydrofuran, following which 6.56 parts of the trifunctional ethylene glycol-propylene glycol random copolymer Sannix FA-103 (EO/PO=8/2; weight-average molecular weight (Mw)=3282; produced by Sanyo Chemical Industries, Ltd.), 0.27 part of 1,4-butanediol as the difunctional polyol, and 1.00 part of ethylene cyanohydrin as the alcohol compound having a large dipole moment were added and dissolved such as to set the weight of lithium perchlorate+the weight of the polymeric compound at 1 kg per mole of lithium perchlorate. The resulting solution was held at reduced pressure to evaporate the tetrahydrofuran. Next, 3.66 parts of polymeric MDI (MR-200, produced by NPU) was added, followed by stirring and vacuum degassing, then 0.02 part of the catalyst NC-IM (produced by Sankyo Air Products Co., Ltd.) and 0.01 part of a defoamer (produced by Bik Chemie Japan Co., Ltd.) were added to give a polymeric compound-lithium perchlorate complex as the ion-conductive polymer electrolyte composition.

The infrared absorption spectrum of the resulting composition (complex) was found to have urethane bond (R—O—CO—N—) absorption at 1740 to 1690 cm$^{-1}$ and cyano group absorption at 2230 to 2130 cm$^{-1}$, confirming that the —CH$_2$CH$_2$CN groups are coupled through NHCOO linkages to the polyurethane compound prepared from the polyol compound and the isocyanate compound. In addition, the complex did not dissolve in the solvent, demonstrating that it was a three-dimensional crosslinked structure.

The conductivity and bond strength of the resulting composition were measured as described below. In addition, the composition was held at 100° C. for 5 hours, and the percent weight loss by evaporation was measured. The results are shown in Table 2.

Conductivity

The cured complex was sandwiched between two copper sheets separated by a 200 μm gap, and the conductivity was determined by AC impedance measurement.

Bond Strength

The bond strength was determined based on the peeling bond strength test procedure standards for adhesives set forth in JIS K6854. More specifically, a T-peel test piece having a thickness of 0.6 mm, a width of 25.5±0.2 mm, and a length of 300 mm was prepared from copper plates surface-treated with sandpaper as the adherend. Both ends of the test piece were attached to fixable crossheads on a testing machine, and measurement was carried out. The cross-head was moved at a rate of 100±10 mm/min until the portion of the test piece remaining bonded was about 10 mm. The measurement results were subjected to best-fit straight line approximation, and the peeling bond strength was determined from the resulting peel load in accordance with JIS Z8401.

Example 2

A polymeric compound-lithium perchlorate complex (ion-conductive polymer electrolyte composition) was prepared by the same method as in Example 1, except that the amount of ethylene cyanohydrin was changed to 0.57 part and the amount of polymeric MDI (MR-200, from NPU) was changed to 2.81 parts in order to keep [NCO]/[OH]≧1.

The resulting composition (complex) was a three-dimensional crosslinked structure. The presence of urethane bonds and cyano groups was confirmed by analysis.

The conductivity and bond strength of the composition thus obtained were measured by the same methods as in Example 1. In addition, the composition was held at 100° C. for 5 hours, and the percent weight loss by evaporation was measured. The results are presented in Table 2.

Example 3

A polymeric compound-lithium perchlorate complex (ion-conductive polymer electrolyte composition) was prepared by the same method as in Example 1, except that the amount of ethylene cyanohydrin was changed to 0.29 part and the amount of polymeric MDI (MR-200, from NPU) was changed to 2.25 parts in order to keep [NCO]/[OH]≧1.

The resulting composition (complex) was a three-dimensional crosslinked structure. The presence of urethane bonds and cyano groups was confirmed by analysis.

The conductivity and bond strength of the composition thus obtained were measured by the same methods as in Example 1. In addition, the composition was held at 100° C. for 5 hours, and the percent weight loss by evaporation was measured. The results are presented in Table 2.

Example 4

A polymeric compound-lithium perchlorate complex (ion-conductive polymer electrolyte composition) was prepared by the same method as in Example 1, except that 1.69 parts of cyanophenol was used instead of ethylene cyanohydrin.

The resulting composition (complex) was a three-dimensional crosslinked structure. The presence of urethane bonds and cyano groups was confirmed by analysis.

The conductivity and bond strength of the composition thus obtained were measured by the same methods as in Example 1. In addition, the composition was held at 100° C. for 5 hours, and the percent weight loss by evaporation was measured. The results are presented in Table 2.

Example 5

A polymeric compound-lithium perchlorate complex (ion-conductive polymer electrolyte composition) was prepared by the same method as in Example 1, except that 1.13 parts of 2-chloroethanol was used instead of ethylene cyanohydrin.

The resulting composition (complex) was a three-dimensional crosslinked structure. The presence of urethane bonds and cyano groups was confirmed by analysis.

The conductivity and bond strength of the composition thus obtained were measured by the same methods as in Example 1. In addition, the composition was held at 100° C. for 5 hours, and the percent weight loss by evaporation was measured. The results are presented in Table 2.

Example 6

A polymeric compound-lithium perchlorate complex (ion-conductive polymer electrolyte composition) was prepared by the same method as in Example 1, except that 4.94 parts of the ethylene glycol-propylene glycol random copolymer Unilube 50TG-32U (EO/PO=5/5; Mw=2468; produced by NOF Corp.) was used instead of the trifunctional ethylene glycol-propylene glycol random copolymer Sannix FA-103.

The resulting composition (complex) was a three-dimensional crosslinked structure. The presence of urethane bonds and cyano groups was confirmed by analysis.

The conductivity and bond strength of the composition thus obtained were measured by the same methods as in Example 1. In addition, the composition was held at 100° C. for 5 hours, and the percent weight loss by evaporation was measured. The results are presented in Table 2.

Example 7

A polymeric compound-lithium perchlorate complex (ion-conductive polymer electrolyte composition) was prepared by the same method as in Example 1, except that 1.2 parts of polyethylene glycol 400 was used instead of the difunctional polyol 1,4-butanediol.

The resulting composition (complex) was a three-dimensional crosslinked structure. The presence of urethane bonds and cyano groups was confirmed by analysis.

The conductivity and bond strength of the composition thus obtained were measured by the same methods as in Example 1. In addition, the composition was held at 100° C. for 5 hours, and the percent weight loss by evaporation was measured. The results are presented in Table 2.

Example 8

Polyurethane compound and Preparation of Nonaqueous Solvent-Containing Polymer Electrolyte Composition 6.56 parts of the trifunctional ethylene glycol-propylene glycol random copolymer Sannix FA-103 (EO/PO=8/2; Mw=3282; produced by Sanyo Chemical Industries, Ltd.), 0.27 part of the difunctional polyol 1,4-butanediol, and 1.00 part of ethylene cyanohydrin as the alcohol compound having a large dipole moment were mixed. Next, 3.66 parts of polymeric MDI (MR-200, produced by NPU) was added thereto, followed by stirring and vacuum degassing. Then, 0.02 part of the catalyst NC-IM (produced by Sankyo Air Products Co., Ltd.) and 0.01 part of a defoamer (produced by Bik Chemie Japan Co., Ltd.) were added thereto to prepare a polyurethane comound.

A polyurethane compound-lithium perchlorate complex (ion-conductive polymer electrolyte composition) was prepared by adding to resulting polymeric compound 11.49 parts of a solution of 1 mol/liter lithium perchlorate in a nonaqueous solvent propylene carbonate so that the ratio of the polyurethane component to the nonaqueous solvent was set at 1:1.

The resulting composition (complex) was a three-dimensional crosslinked structure. The presence of urethane bonds and cyano groups was confirmed by analysis.

The conductivity and bond strength of the composition thus obtained were measured by the same methods as in Example 1. The results are presented in Table 2.

Example 9

A polymeric compound-lithium perchlorate complex (ion-conductive polymer electrolyte composition) was prepared by the same method as in Example 8, except that the amount of the solution of 1 M lithium perchlorate in nonaqueous solvent propylene carbonate was changed to 34.47 parts, thereby setting the ratio of polyurethane component to nonaqueous solvent at 1:3.

The resulting composition (complex) was a three-dimensional crosslinked structure. The presence of urethane bonds and cyano groups was confirmed by analysis.

The conductivity and bond strength of the composition thus obtained were measured by the same methods as in Example 1. The results are presented in Table 2.

Comparative Example 1

A polymeric compound-lithium perchlorate complex (ion-conductive polymer electrolyte composition) was prepared by the same method as in Example 1, except that 5.61 parts of the monofunctional polyethylene glycol monoalkyl ether Uniox M-400 (weight-average molecular weight (Mw)=400; produced by NOF Corp.), which lacks a substituent having a large dipole moment, was used instead of ethylene cyanohydrin.

The resulting composition (complex) was a three-dimensional crosslinked structure. The presence of urethane bonds was confirmed by analysis.

The conductivity and bond strength of the composition thus obtained were measured by the same methods as in Example 1. In addition, the composition was held at 100° C. for 5 hours, and the percent weight loss by evaporation was measured. The results are presented in Table 2.

Comparative Example 2

Lithium perchlorate (1.19 part) was dissolved in polyethylene glycol 2000 (10.00 parts) using a suitable amount of tetrahydrofuran so as to prepare a dope containing 1 mole of lithium perchlorate per kilogram of total weight. This was cast using a doctor knife applicator and held under applied pressure in a 60° C. oven for 1 hour for evaporating off the tetrahydrofuran, giving a conductive solid polymer electrolyte.

The resulting solid polymer electrolyte was measured for conductivity, bond strength and percent weight loss by evaporation by the same methods as in Example 1. The results are shown in Table 2.

TABLE 1

| | Component (A) | | Component (B) | Component (C) Alcohol compound with | | |
|---|---|---|---|---|---|---|
| | Trifunctional polyol (g) | Difunctional polyol (g) | Polyfunctional isocyanate (g) | large dipole moment (g) | Blending ratio[1] | NCO index[3] |
| EX 1 | FA-103 (6.56) | 1,4-butanediol (0.27) | MR-200 (3.66) | ethylene cyanohydrin (1.00) | 0.087 | 1.04 |

TABLE 1-continued

|  | Component (A) | | Component (B) | Component (C) Alcohol compound with | | |
| --- | --- | --- | --- | --- | --- | --- |
|  | Trifunctional polyol (g) | Difunctional polyol (g) | Polyfunctional isocyanate (g) | large dipole moment (g) | Blending ratio[1] | NCO index[2] |
| EX 2 | FA-103 (6.56) | 1,4-butanediol (0.27) | MR-200 (2.81) | ethylene cyanohydrin (0.57) | 0.056 | 1.04 |
| EX 3 | FA-103 (6.56) | 1,4-butanediol (0.27) | MR-200 (2.25) | ethylene cyanohydrin (0.29) | 0.031 | 1.04 |
| EX 4 | FA-103 (6.56) | 1,4-butanediol (0.27) | MR-200 (3.66) | cyanophenol (1.69) | 0.14 | 1.04 |
| EX 5 | FA-103 (6.56) | 1.4-butanediol (0.27) | MR-200 (3.66) | 2-chloroethanol (1.13) | 0.098 | 1.04 |
| EX 6 | 50TG-32U (4.94) | 1,4-butanediol (0.27) | MR-200 (3.66) | ethylene cyanohydrin (1.00) | 0.101 | 1.04 |
| EX 7 | FA-103 (6.56) | PEG 400 (1.2) | MR-200 (13.66) | ethylene cyanohydrin (1.00) | 0.081 | 1.04 |
| EX 8 | FA-103 (6.56) | 1.4-butanediol (0.27) | MR-200 (3.66) | ethylene cyanohydrin (1.00) | 0.087 | 1.04 |
| EX 9 | FA-103 (6.56) | 1,4-butanediol (0.27) | MR-200 (3.66) | ethylene cyanohydrin (1.00) | 0.087 | 1.04 |
| CE 1 | FA-103 (6.56) | 1,4-butanediol (0.27) | MR-200 (3.66) | M-400 (5.61) | 0.028 | 1.04 |
| CE 2 |  | polyethylene glycol, 2000 (10.0) |  |  | — | — |

[1]Blending ratio = (C)/((A) + (B) + (C))
[2]NCO index = [NCO]/[OH]

FA-103: The trifunctional ethylene glycol-propylene glycol random copolymer Sannix FA-103 (EO/PO=8/2; weight-average molecular weight (Mw)=3282), produced by Sanyo Chemical Industries, Ltd.
50TG-32U: The ethylene glycol-propylene glycol random copolymer Unilube 50TG-32U (EO/PO=5/5; weight-average molecular weight (Mw)=2468), produced by NOF Corp.
Difunctional polyol: 1,4-Butanediol
PEG 400: Polyethylene glycol 400
MR-200: Polymeric MDI (produced by NPU)
M-400: The monofunctional polyethylene glycol monoalkyl ether Uniox M-400 (weight-average molecular weight (Mw)=400), produced by NOF Corp.

TABLE 2

|  | Conductivity (S/cm) | Bond strength (kN/m) | Weight loss by Evaporation (%) |
| --- | --- | --- | --- |
| Example 1 | 3.00 × 10$^{-4}$ | 2.61 | ≦0.1 |
| Example 2 | 2.40 × 10$^{-4}$ | 2.28 | ≦0.1 |
| Example 3 | 2.00 × 10$^{-4}$ | 2.10 | ≦0.1 |
| Example 4 | 1.50 × 10$^{-4}$ | 1.76 | ≦0.1 |
| Example 5 | 1.00 × 10$^{-4}$ | 1.65 | ≦0.1 |
| Example 6 | 2.80 × 10$^{-4}$ | 2.53 | ≦0.1 |
| Example 7 | 2.70 × 10$^{-4}$ | 2.41 | ≦0.1 |
| Example 8 | 1.20 × 10$^{-3}$ | 1.02 | — |
| Example 9 | 3.40 × 10$^{-3}$ | 1.01 | — |
| Comparative Example 1 | 4.00 × 10$^{-5}$ | 0.787 | ≦0.1 |
| Comparative Example 2 | 2.20 × 10$^{-5}$ | ≦0.01 | ≦0.1 |

Example 10

Preparation of Ion-Conductive Solid Polymer Electrolyte Film-Type Battery 6.56 Parts of the trifunctional ethylene glycol-propylene glycol random copolymer Sannix FA-103 (EO/PO=8/2; Mw=3282, produced by Sanyo Chemical Industries, Ltd.), 0.27 part of the difunctional polyol 1,4-butanediol, and 1.00 part of ethylene cyanohydrin as the alcohol compound having a large dipole moment were mixed. Next, 3.66 parts of polymeric MDI (MR-200, produced by NPU) was added thereto to prepare a polyurethane compound, giving a liquid I.

To the liquid I was added 1.37 parts of lithium perchlorate which is obtained by disolving lithium perchlorate in suitable amounts of tetrahydorofuran such as to set the weight of lithium perchlorate+the weight of the polymeric compound at 1 kg per mole of lithium perchlorate.

The resulting solution was allowed to stand under a reduced pressure to evaporate tetrahydorofuran, giving a liquid II.

Next, the positive electrode was fabricated by blending a powder mixture of LiCoO$_2$ and Ketjen Black in a weight ratio of 90:10 with the liquid I to powder weight ratio of 1:10 so as to give a positive electrode dope. Using a doctor knife applicator, the dope was cast onto a positive electrode current collector in the form of aluminum foil, then held at 80° C. for 2 hours to render it into a semisolid state, thereby giving a sheet-like composite positive electrode.

For the negative electrode, lithium foil was used. The lithium foil was press-bonded onto a stainless steel current collector.

Next, the liquid II was placed in a slight excess on the surface of the negative electrode lithium foil. The sheet-like composite positive electrode was stacked on top thereof such as to face the negative electrode across a gap of 25 μm between the surface of the composite positive electrode and the lithium foil surface of the negative electrode, and pressure was applied. The electrodes were held in this state at about 80° C. for 6 hours to effect curing. This caused the liquid II disposed between the sheet-like composite positive electrode and the lithium foil of the negative electrode to thermally polymerize, resulting in the formation of a solid polymer electrolyte layer and thus giving an ion-conductive solid polymer electrolyte film-type battery.

The resulting film-type battery had an aluminum foil/composite positive electrode/cured liquid II/lithium foil/stainless steel current collector construction, was rechargeable, and clearly functioned effectively as a lithium secondary battery.

Example 11

An ion-conductive solid polymer electrolyte film-type battery was fabricated by the same method as in Example 10 except that the negative electrode was prepared by using graphite as the active material, mixing the liquid I of Example 10 with graphite in a binder to active material weight ratio of 1:9 to form a negative electrode dope, casting the negative electrode dope onto a negative electrode current collector in the form of copper foil by means of a doctor knife applicator, and allowing the coating to stand at 80° C. for 2 hours, yielding a sheet-like composite negative electrode in semi-solid state.

The resulting film-type battery had an aluminum foil/composite positive electrode/cured liquid II/composite negative electrode/copper foil construction, was rechargeable, and clearly functioned effectively as a lithium battery.

As is evident from the above results, the polyurethane compound having a substituent with a large dipole moment introduced onto the polyurethane molecule according to the invention can improve the closeness of contact between the electrodes and the electrolyte and achieve an interfacial impedance comparable to that of an electrolyte solution, while retaining a high dielectric constant and the ability to dissolve the ion-conductive salt to a high concentration. The polymeric compound provides a binder resin which can firmly bond powdery battery active materials.

Moreover, ion-conductive polymer electrolyte compositions which are comprised mainly of an ion-conductive salt and a polyelectrolyte-providing polymer made of the inventive polymeric compound have a high ion conductivity and a high bond strength. When these compositions are disposed between a positive electrode and a negative electrode, the resulting secondary cells feature a high ionic conductivity and the firm bond of the positive and negative electrodes with the solid electrolyte and are thus highly suitable for use as film-type batteries and other type of secondary batteries.

What is claimed is:

1. A polyurethane compound for electrochemical cells prepared by reacting an excess of an isocyanate compound with a polyol compound to form a polyurethane compound and reacting a hydroxyl group of a monohydric alcohol compound bearing a substituent having a dipole moment with some or all of remaining isocyanate groups on the polyurethane compound, wherein said substituent having a dipole moment is coupled to said polyurethane compound through a NHCOO linkage, wherein the substituent having a dipole moment on the monohydric alcohol is at least one type selected from the class consisting of —OCH$_3$, —SCH$_3$, —NH$_2$, —COOCH$_3$, —NO$_2$ and —CN.

2. A binder resin for a positive or negative electrode comprising the polyurethane compound of claim 1.

3. The binder resin of claim 2 which has a bond strength of at least 0.8 kN/m as measured according to the procedure of JIS K6854.

4. An ion-conductive polymer electrolyte composition comprising an ion-conductive salt and the polyurethane compound of claim 1.

5. The composition of claim 4 which is obtained by reacting (A) an isocyanate compound, (B) a polyol compound and (C) an alcohol compound bearing at least one hydroxyl group and at least one substituent having a dipole moment in a molecule, in a solvent dissolving the ion-conductive salt.

6. The composition of claim 5 which has a bond strength of at least 0.8 kN/m as .measured according to the procedure of JIS K6854.

7. The composition of claim 4 which has a bond strength of at least 0.8 kN/m as measured according to the procedure of JIS K6854.

8. A secondary cell comprising a positive electrode, a negative electrode and a solid polymer electrolyte layer, characterized in that the solid polymer electrolyte layer is composed of the ion-conductive polymer electrolyte composition of claim 4, 5, 7 or 6 and lies between the positive electrode and the negative electrode.

9. The secondary cell of claim 8 wherein the positive electrode is a composite positive electrode comprising a positive electrode current collector coated with a positive electrode dope composed of a binder resin comprising the polyurethane compound and an active positive electrode material in admixture.

10. The secondary cell of claim 9, wherein the binder resin has a bond strength of at least 0.8 kN/m as measured according to the procedure of JIS K6854.

11. The secondary cell of claim 9 wherein the negative electrode is a negative electrode composed of lithium foil or a composite negative electrode comprising a negative electrode current collector coated with a negative electrode dope composed of a binder resin comprising the polyurethane compound and an active negative electrode material in admixture.

12. The secondary cell of claim 11, wherein the binder resin has a bond strength of at least 0.8 kN/m as measured according to the procedure of JIS K6854.

13. The polyurethane compound of claim 1, wherein the monohydric alcohol is at least one type selected from the class consisting of the amino group-bearing compounds aminoethanol, propanolamine, ethanolamine, acetylethanolamine and aminochlorophenol; the acetyl group-bearing compounds acetylnaphthol and N-acetylethanolamine; the nitro group-bearing compounds nitroethanol, nitrophenol and methylnitrophenol; and cyano group-bearing compounds ethylene cyanohydrin, hydroxyacetonitrile, cyanophenol and cyanobenzyl alcohol.

* * * * *